United States Patent
Park et al.

(10) Patent No.: US 11,995,887 B2
(45) Date of Patent: May 28, 2024

(54) APPARATUS AND METHOD OF ANALYZING DEVELOPED IMPACT MARKS, AND COMPUTER PROGRAM FOR EXECUTING THE METHOD

(71) Applicant: REPUBLIC OF KOREA (NATIONAL FORENSIC SERVICE DIRECTOR MINISTRY OF THE INTERIOR AND SAFETY), Wonju-si (KR)

(72) Inventors: Nam Kyu Park, Bucheon-si (KR); Byung Seon Moon, Busan (KR); Jae Mo Goh, Wonju-si (KR); Jin Pyo Kim, Daejeon (KR); Young Il Seo, Wonju-si (KR); Eun Ah Joo, Yongin-si (KR); Je Hyun Lee, Wonju-si (KR); Sang Yoon Lee, Wonju-si (KR)

(73) Assignee: REPUBLIC OF KOREA (NATIONAL FORENSIC SERVICE DIRECTOR MINISTRY OF THE INTERIOR AND SAFETY), Wonju-si (KR)

( * ) Notice: Subject to any disclaimer, the term of this patent is extended or adjusted under 35 U.S.C. 154(b) by 185 days.

(21) Appl. No.: 17/518,570

(22) Filed: Nov. 3, 2021

(65) Prior Publication Data

US 2023/0060092 A1    Feb. 23, 2023

(30) Foreign Application Priority Data

Aug. 20, 2021  (KR) ........................ 10-2021-0110396

(51) Int. Cl.
*G06V 10/44*    (2022.01)
*G06F 18/22*    (2023.01)
*G06V 20/00*    (2022.01)

(52) U.S. Cl.
CPC .............. *G06V 20/35* (2022.01); *G06F 18/22* (2023.01); *G06V 10/44* (2022.01)

(58) Field of Classification Search
CPC ....... G06T 7/13; G06T 7/0014; G06V 10/751; G06V 20/35; G06V 10/44; G06F 18/22; G01N 33/68
See application file for complete search history.

(56) References Cited

U.S. PATENT DOCUMENTS 5,871,804 A  *  2/1999  Wilkinson ........... G01N 33/582
                                                                427/145
11,906,197 B1 *  2/2024  Des Champs ........ F24F 13/222
(Continued)

FOREIGN PATENT DOCUMENTS

CN          112683193 B  *  4/2022
KR     10-2018-0070472 A      6/2018
(Continued)

OTHER PUBLICATIONS

Hong et al. "Use of Squid as an Alternative to Human Skin for Studying the Development of Hit Marks on Clothes." Journal of Forensic Research 7. (Year: 2016).*
(Continued)

*Primary Examiner* — Shaghayegh Azima
(74) *Attorney, Agent, or Firm* — Hauptman Ham, LLP

(57) ABSTRACT

A developed impact mark analysis apparatus includes: an image acquisition unit configured to obtain at least one first image by photographing impact marks that are developed, and to obtain a second image of impact marks at a crime scene that are developed from evidence at the crime scene; an outliner configured to outline the at least one first image to obtain at least one first outline image, and to outline the second image to obtain a second outline image; a database configured to store the first outline image corresponding to related tool characteristic information; a matching unit con-
(Continued)

figured to search the database for the first outline image determined to be similar to the second outline image and match them with each other; a display unit; and a user input unit.

8 Claims, 10 Drawing Sheets

(56) References Cited

U.S. PATENT DOCUMENTS

| | | | | |
|---|---|---|---|---|
| 2007/0026130 A1* | 2/2007 | Arndt | ................... | B41M 3/001 427/1 |
| 2012/0251703 A1* | 10/2012 | Nalewajek | ............... | G03C 1/73 106/287.28 |
| 2013/0131994 A1* | 5/2013 | Birdwell | ................ | G16B 40/00 702/19 |
| 2015/0161431 A1* | 6/2015 | Hirokawa | ............ | A61B 5/1172 382/125 |
| 2017/0281053 A1* | 10/2017 | Kelarakis | ................ | G06V 40/12 |
| 2017/0351708 A1* | 12/2017 | Lahmann | ................... | G06T 7/12 |
| 2020/0167981 A1* | 5/2020 | Tagra | ....................... | G06T 11/60 |
| 2020/0363317 A1* | 11/2020 | Park | ........................... | A61L 2/10 |
| 2021/0249457 A1* | 8/2021 | Baba | ................... | G06V 40/1318 |
| 2022/0327849 A1* | 10/2022 | Albertini | ............ | G06V 30/1916 |
| 2023/0060092 A1* | 2/2023 | Park | ....................... | G06V 10/44 |

FOREIGN PATENT DOCUMENTS

| | | |
|---|---|---|
| KR | 10-1885066 B1 | 8/2018 |
| KR | 10-2277682 B1 | 7/2021 |

OTHER PUBLICATIONS

Korean Office Action dated Jan. 22, 2024 for corresponding Korean Patent Application No. 10-2021-0110396, along with English machine translation (9 pages).

* cited by examiner

APPARATUS AND METHOD OF ANALYZING DEVELOPED IMPACT MARKS, AND COMPUTER PROGRAM FOR EXECUTING THE METHOD

CROSS-REFERENCE TO RELATED APPLICATION

This application claims the benefit of Korean Patent Application No. 10-2021-0110396, filed on Aug. 20, 2021, in the Korean Intellectual Property Office, the disclosure of which is incorporated herein in its entirety by reference.

BACKGROUND

1. Field

One or more embodiments relate to an apparatus, a method, and a computer program for analyzing developed impact marks.

2. Description of the Related Art

When a victim is hit at a crime scene related to an assault case or a murder case, it is possible to specify what tools or objects were used by analyzing impact marks found at the crime scene. Analysis of the impact marks plays an important role in criminal investigations in that it is possible to grasp a crime method of the case.

Most of evidence existing at a crime scene contains latent traces that are invisible until a chemical development technique is implemented. In an assault or murder case, various tools or objects nearby that can hit a person are used, such as fists, feet, clubs, bricks, hammers, claw hammers, and hatchets.

When a victim is hit, impact marks are left on the victim's clothing. When an amino acid reaction reagent is applied to an inner surface of the clothing in contact with the skin, sweat components from the skin in contact with the clothing are developed, making it possible to visualize shapes and traces of various tools or objects used in the crime.

Whereas a crime tool or object has a three-dimensional shape, impact marks generated and developed from the crime tool or object have a two-dimensional shape. As such, it is difficult to accurately determine what the tool or object used in the crime is because only outline information of a portion where the tool or object collides may be grasped with the impact marks developed in this way. Therefore, it is necessary to develop a technique for analyzing developed impact marks and determining tools or objects used in the crime from this.

[Prior art document] Korean Patent No. 10-2277682 (registered on Jul. 9, 2021)

SUMMARY

One or more embodiments include an apparatus, a method, and a computer program for analyzing developed impact marks.

In more detail, one or more embodiments include an apparatus, a method, and a computer program for determining a tool used in a crime by outlining an image of impact marks developed using an amino acid reaction reagent and registering the outline image in a database, then searching the database for an outline image similar to an outline image of developed impact marks at a crime scene and matching them with each other.

According to one or more embodiments, a developed impact mark analysis apparatus includes: an image acquisition unit configured to obtain at least one first image by photographing impact marks that are developed by applying an amino acid reaction reagent, and to obtain a second image of impact marks at a crime scene that are developed by applying an amino acid reaction reagent from evidence at the crime scene; an outliner configured to outline the at least one first image to obtain at least one first outline image, and to outline the second image to obtain a second outline image; a database configured to store the first outline image corresponding to related tool characteristic information; a matching unit configured to search the database for the first outline image determined to be similar to the second outline image and match them with each other; a display unit configured to display the first image, the second image, the first outline image, the second outline image, or related tool characteristic information; and a user input unit configured to generate an input signal corresponding to a user command.

In an embodiment, the outliner may extract an outline of a tool by converting the first image and the second image into gray scale, adjusting a pixel value of each of the images converted into gray scale, and binarizing the pixel value.

According to one or more embodiments, a developed impact analysis method includes: obtaining at least one first image by photographing impact marks that are developed by applying an amino acid reaction reagent; obtaining at least one first outline image by outlining the at least one first image; storing the first outline image in a database corresponding to related tool characteristic information; obtaining a second image of impact marks at a crime scene that are developed by applying an amino acid reaction reagent from evidence at the crime scene; obtaining a second outline image by outlining the second image; searching the database for the first outline image determined to be similar to the second outline image and matching them with each other; and displaying a result of the matching in which the second outline image, the first outline image matched with the second outline image, and the related tool characteristic information are displayed to a user.

In an embodiment, after a user applies an impact to fabric or clothing in close contact with the animal skin using a tool, the developed impact marks may be developed by applying an amino acid reaction reagent to the fabric or clothing.

In an embodiment, the tool characteristic information may include a type of tool, and size, use, or shape characteristics according to the type of tool.

In an embodiment, the obtaining of the first outline image may include converting the first image into gray scale; adjusting and binarizing a pixel value of the first image converted into gray scale; and extracting an outline of a tool from the first image that is binarized.

In an embodiment, the obtaining of the second outline image may include converting the second image into gray scale; adjusting and binarizing a pixel value of the second image converted into gray scale; and extracting an outline of a tool from the the second image that is binarized.

Provided is a non-transitory computer-readable recording medium having recorded thereon a program for executing a developed impact analysis method according to an embodiment.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
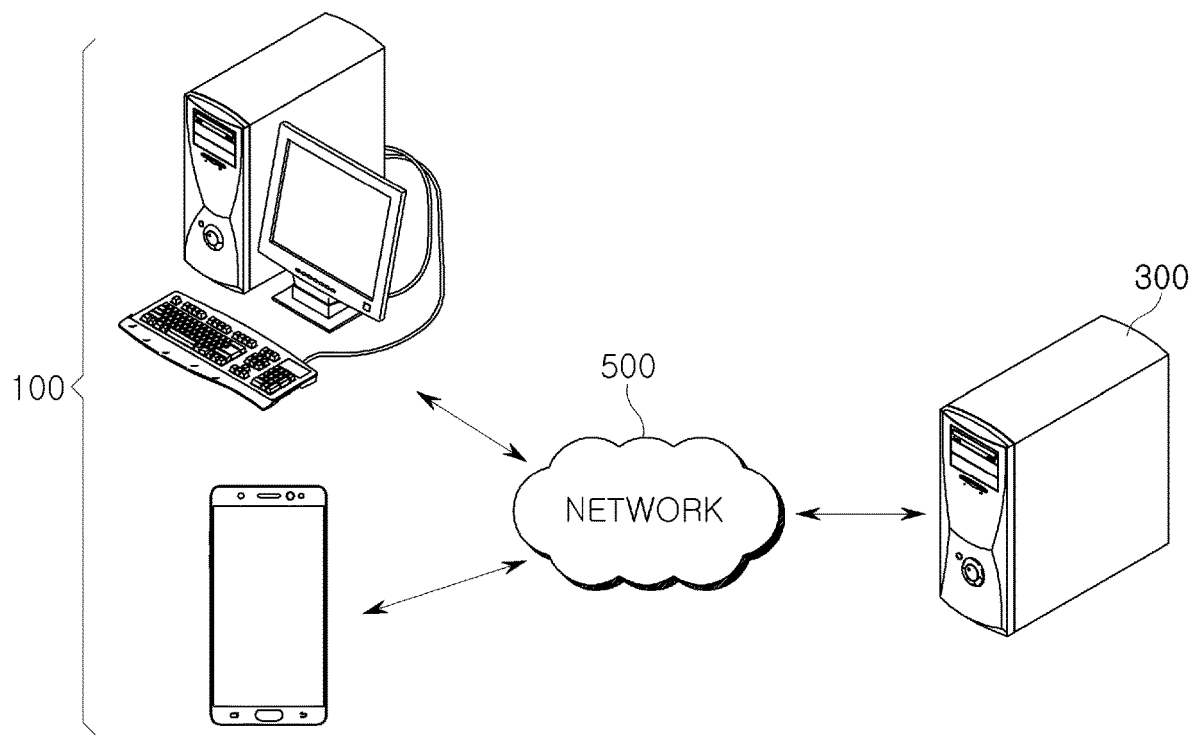
FIG. 1 is a view of a developed impact mark analysis system according to an embodiment.

Hereinafter, embodiments will be described in detail with reference to the accompanying drawings. The same reference numerals are used to denote the same elements, and repeated descriptions thereof will be omitted.

It will be understood that although the terms "first," "second," etc. may be used herein to describe various components, these components should not be limited by these terms.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of description, the following embodiments are not limited thereto. When a certain embodiment may be implemented differently, a specific process order may be performed differently from the described order. For example, two consecutively described processes may be performed substantially at the same time or performed in an order opposite to the described order.

It will be understood that when a layer, region, or component is connected to another portion, the layer, region, or component may be directly connected to the portion or an intervening layer, region, or component may exist. For example, when a layer, region, or component is electrically connected to another portion, the layer, region, or component may be directly electrically connected to the portion or may be indirectly electrically connected to the portion through another layer, region, or component.

As used herein, the term 'impact marks' refers to traces caused by adhesion of skin components such as sweat or keratin from the skin on the inside of clothes due to friction caused by strong pressure when an impact is applied to the body by a tool or the like. By inferring the external physical force applied to the victim of a violent crime through impact marks, it is possible not only to estimate the interaction between the victim and the suspect, but also to infer tool information related to a case.

FIG. 1 is a view of a developed impact mark analysis system according to an embodiment.

Referring to FIG. 1, the developed impact mark analysis system according to an embodiment may include a developed impact mark analysis apparatus 100, a server 300, and a network 500.

The developed impact mark analysis system according to an embodiment provides a developed impact mark analysis service. In more detail, the developed impact mark analysis system provided according to an embodiment may upload data obtained by a developed impact mark analysis method 200 that a user tests, and may share the uploaded data with other users. For example, a user may upload data about an image of developed impact marks generated using a tool. The impact mark analysis system according to an embodiment, when a user uploads data, may register the data in the server 300, and may provide an interface for other users to inquire data registered in the server 300.

The developed impact mark analysis apparatus 100 may be connected to the server 300 through the network 500. The developed impact mark analysis apparatus 100 to which the disclosure is applied may be various types of information processing devices used by a user, for example, a personal computer (PC), a laptop computer, a mobile phone, a tablet PC, a smart phone, personal digital assistants (PDA), or the like. However, these are only examples, and in addition to the above-described examples, the developed impact mark analysis apparatus 100 needs to be interpreted as a concept including all devices capable of communication that are currently developed and commercialized or to be developed in the future. The developed impact mark analysis method 200 provided according to an embodiment may be borrowed without limitation on any device as long as an application in which the developed impact mark analysis method 200 is programmed can be installed.

The network 500 connects the developed impact mark analysis apparatus 100 to the server 300. For example, the network 500 provides a connection path such that the developed impact mark analysis apparatus 100 may transmit and receive packet data after accessing the server 300.

Although not shown in the drawings, the server 300 according to an embodiment may include a memory, an input/output unit, a program storage unit, a control unit, and the like.

Figure 2:
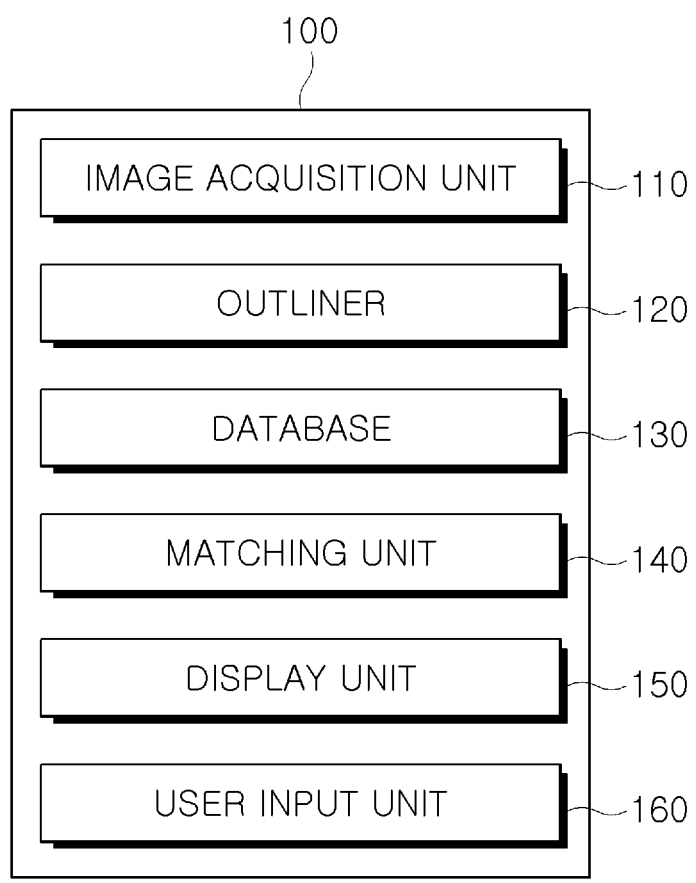
FIG. 2 is a block diagram of a developed impact mark analysis apparatus according to an embodiment.

FIG. 2 is a block diagram of the developed impact mark analysis apparatus 100 of FIG. 1

The developed impact mark analysis apparatus 100 according to an embodiment may correspond to at least one processor or may include at least one processor. Accordingly, the developed impact mark analysis apparatus 100 may be driven in a form included in a hardware device such as a microprocessor or a general-purpose computer system.

The developed impact mark analysis apparatus 100 in FIG. 2 shows only components associated with the present embodiment to prevent features of the present embodiment is blurred. Accordingly, it is to be understood by one of ordinary skill in the art that other general-purpose components may be further included in addition to the components shown in FIG. 2.

Referring to FIG. 2, the developed impact mark analysis apparatus 100 according to an embodiment may include an image acquisition unit 110, an outliner 120, a database 130, a matching unit 140, a display unit 150, and a user input unit 160.

The image acquisition unit 110 may obtain at least one first image by photographing impact marks that are developed by applying an amino acid reaction reagent, and may obtain a second image for impact marks at a crime scene that are developed by applying an amino acid reaction reagent from evidence at the crime scene.

The image acquisition unit 110 may obtain an image by directly photographing developed impact marks. In addition, the image acquisition unit 110 may receive an image from another imaging device or the server 300.

On the other hand, the image acquisition unit 110 may include, for example, a camera including a lens and an image sensor. The image sensor may convert an image input by the lens into an electrical signal. For example, the image sensor may be a semiconductor device such as a charge-coupled device (CCD) or a complementary metal oxide semiconductor (CMOS).

The outliner 120 may obtain at least one first outline image by outlining the at least one first image, and may obtain a second outline image by outlining the second image.

The outliner 120 may convert the first image into gray scale, adjust a pixel value of the first image converted into gray scale, and binarize the pixel value to extract an outline of a tool.

In addition, the outliner 120 may convert the second image into gray scale, adjust a pixel value of the second image converted into gray scale, and binarize the pixel value to extract an outline of a tool.

The outliner 120 may obtain the first outline image and the second outline image through this process.

The database 130 may store the first outline image corresponding to related tool characteristic information. Referring to FIG. 2, in the disclosure, the database 130 is included in the developed impact mark analysis apparatus 100, but according to the needs of one of skill in the art for implementing the disclosure, the database 130 may be configured separately from the developed impact mark analysis apparatus 100. In addition, the tool characteristic information related to the first outline image may include a type of tool, and size, use, or shape characteristics according to the type of tool.

The matching unit 140 may search the database 130 for the first outline image that is determined to be similar to the second outline image and match them.

For example, the matching unit 140, after thinning the second outline image and the at least one first outline image registered in the database 130, may extract feature points from the thinned first and second outline images, respectively, and compare the feature points with each other to determine whether they are similar. A feature point refers to a feature element included in each of the outline images, and details will be described later below.

The display unit 150 may display the obtained first image, second image, first outline image, second outline image, or related tool characteristic information. The display unit 150 may display an image and information related to an embodiment of the disclosure that a user wants to select and display through the user input unit 160.

The user input unit 160 may generate an input signal corresponding to a user command. When a user performs operations according to the developed impact mark analysis method 200 that will be described later below, the user may input a necessary selection through the user input unit 160.

Figure 3:
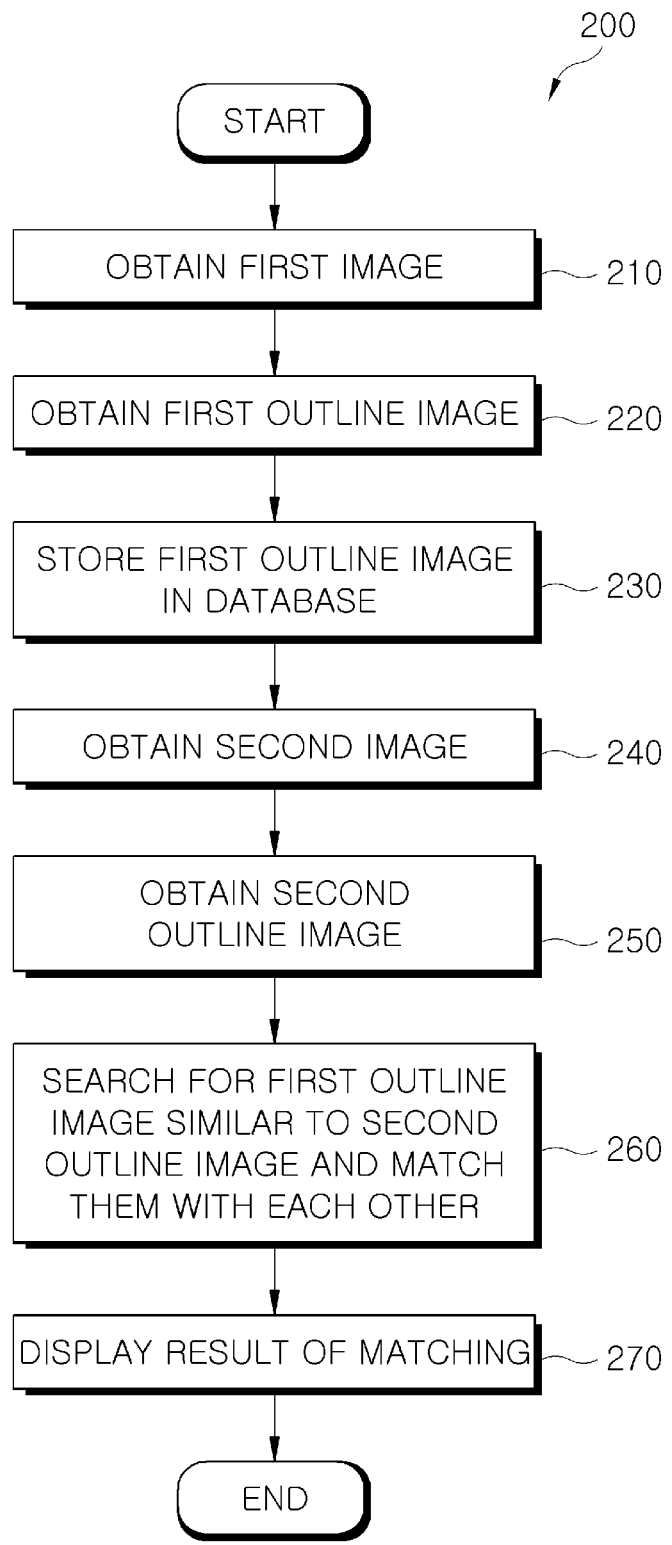
FIGS. 3 and 4 are flowcharts illustrating a developed impact mark analysis method according to an embodiment.
Figure 4:
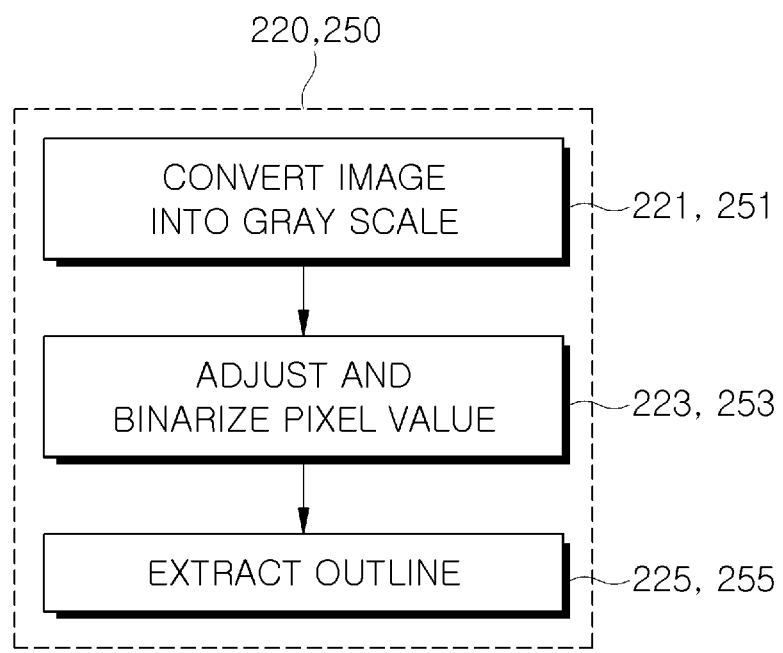

FIGS. 3 and 4 are flowcharts illustrating a developed impact mark analysis method according to an embodiment.

FIGS. 5 to 10 are exemplary views for explaining an embodiment of a developed impact mark analysis method according to an embodiment.

Referring to FIGS. 3 to 10, the developed impact mark analysis method 200 according to an embodiment is as follows.

Operation 210 is obtaining, by the developed impact mark analysis apparatus 100, at least one first image by photographing impact marks that are developed by applying an amino acid reaction reagent.

While maintaining the laboratory's temperature and humidity at specific conditions, a user may use a tool to impact animal skin on fabric or clothing. A skin component of the animal may be transferred to the inside of the fabric or clothing subjected to the impact in this way, and impact marks may be generated. In this case, because it is difficult for a user to directly apply an impact to human skin, the user may apply an impact to animal skin such as soaked squid or pig skin.

Because such a skin component contains an amino acid component, an amino acid reaction reagent may be applied to fabric or clothing to develop impact marks. The amino acid reaction reagent used in the impact mark development may include ninhydrin, DFO, 1,2-IND-Zn, and the like.

As such, a first image may be obtained by directly photographing the impact marks that are developed by applying the amino acid reaction reagent using an image acquisition button 151, or by receiving a first image obtained by photographing the developed impact marks from the server 300 or an external imaging device. The first image obtained in this way may be displayed through the display unit 150.

Operation 220 is obtaining, by the developed impact mark analysis apparatus 100, at least one first outline image by outlining the at least one first image.

Operation 220 may include the following operations.

Operation 221 is converting the first image into gray scale by the developed impact mark analysis apparatus 100. A user may use an image conversion button 152 on the display unit 150 to convert the first image into gray scale when the first image is configured in color.

Figure 5:
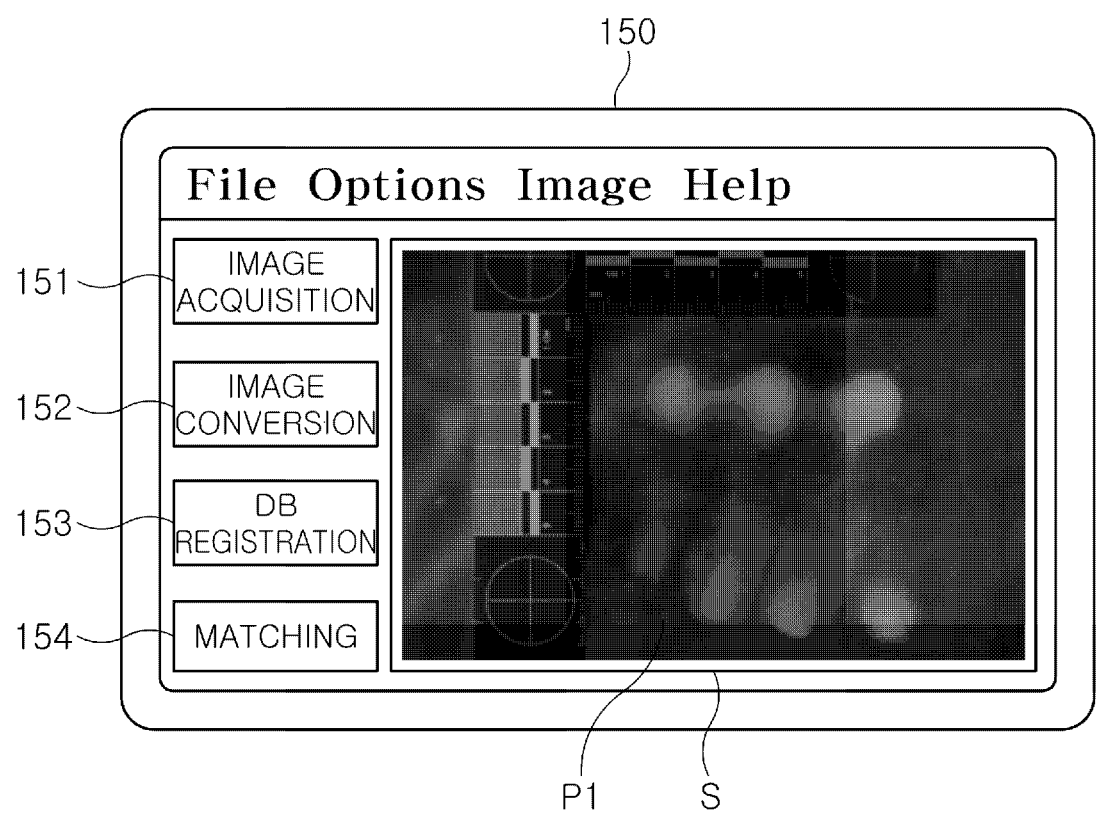
FIGS. 5 to 10 are exemplary views for explaining an embodiment of a developed impact mark analysis method according to an embodiment.

Referring to FIG. 5, a first image P1 converted into gray scale may be checked on a screen S of the display unit 150. In addition, the first image may be obtained in a gray scale state.

Operation 223 is adjusting and binarizing, by the developed impact mark analysis apparatus 100, a pixel value of the first image converted into gray scale. At this time, the contrast between a tool and a background may be maximized by adjusting the pixel value of the first image converted into gray scale. In addition, the pixel value may be adjusted to better develop the shape of the tool. After adjusting the pixel value in this way, a binarization operation of clearly separating the tool and the background into black and white may be performed based on a set threshold.

Through this process, for example, the tool may be clearly expressed in black and the background in white.

Operation 225 is extracting, by the developed impact mark analysis apparatus 100, an outline of the tool from the first image that is binarized.

Figure 6:
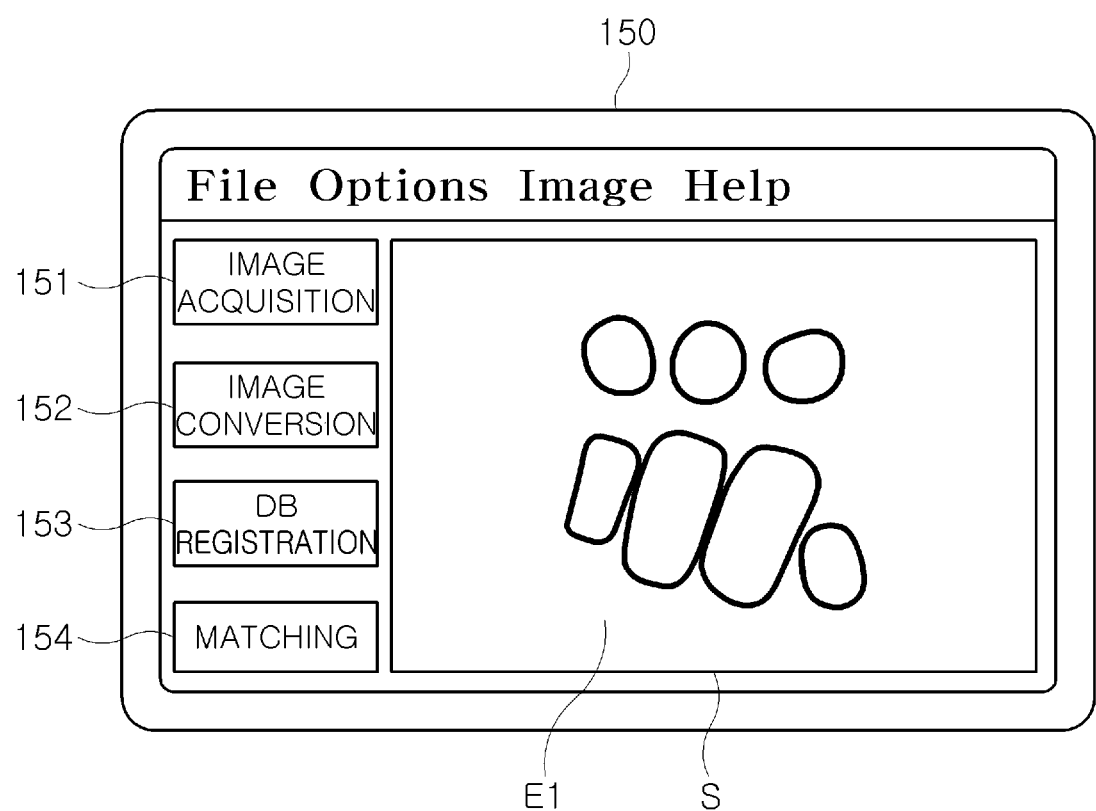

Referring to FIG. 6, an example of a first outline image E1 formed from impact marks by a fist can be seen on the screen S of the display unit 150. In the first outline image E1 formed from the impact marks by the fist, the shape of a metacarpophalangeal joint and the shape of a proximal interphalangeal joint are shown as outlines. In this way, various types of outlines, in which characteristics according to the type of tool may be clearly grasped, may be extracted.

Through operations 221, 223, and 225, the shape of the tool may be more clearly revealed, and the outline of the tool may be extracted.

Operation 230 is storing, by the developed impact mark analysis apparatus 100, a first outline image in the database 130 corresponding to related tool characteristic information.

The tool characteristic information may include a type of tool, and size, use, or shape characteristics according to the type of tool.

The type of the tool may include a fist, a foot (shoe), a club, a hammer, a claw hammer, a hatchet, and the like.

For example, through the shape and size of a joint expressed by an outline in the first outline image formed from impact marks by a fist, it is possible to obtain information such as whether the fist is a left fist or a right fist, gender, age, and the like.

Figure 7:
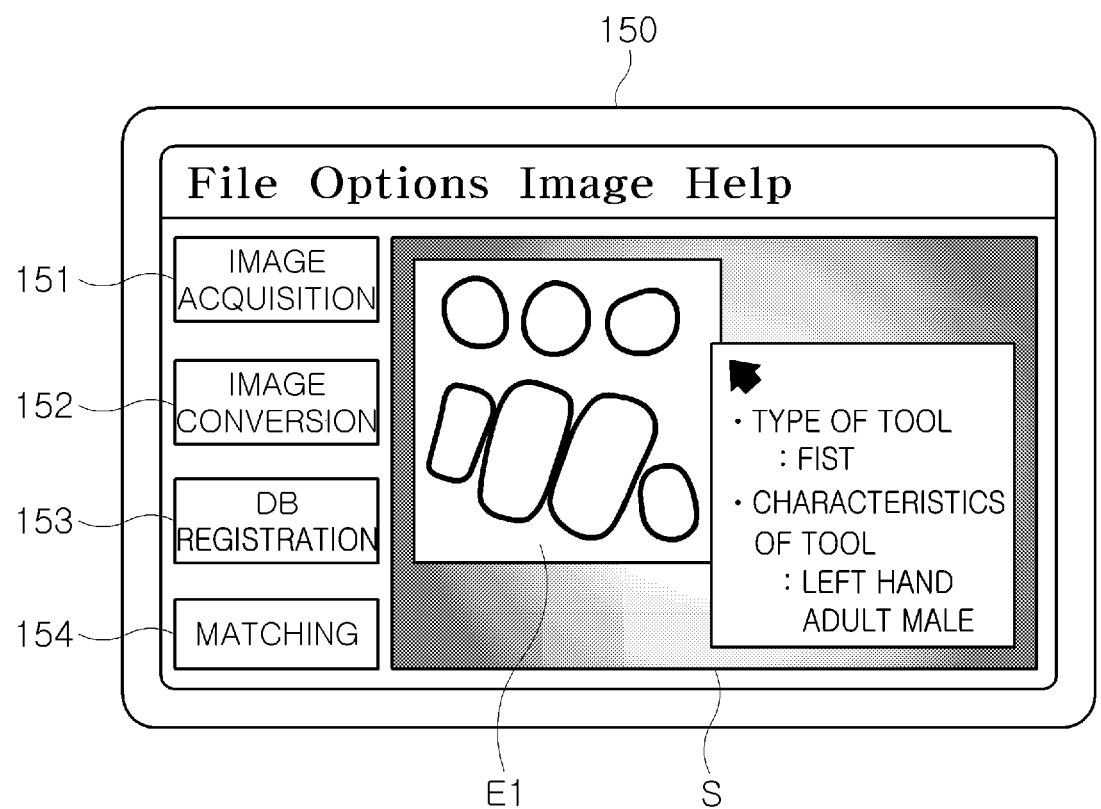

Referring to FIG. 7, related tool characteristic information corresponding to a first outline image formed from impact marks by a fist may be registered in the database 130 by using a DB registration button 153. At this time, tool characteristic information may include information such as 'fist' as a type of tool, 'left hand' and 'adult male' as a characteristic according to the type of tool, and such tool characteristic information is registered in the database 130.

On the other hand, in the case of a first outline image formed from impact marks by a shoe, characteristics such as a size of the shoe, a characteristic pattern of the sole of the shoe, and the habit of a shoe wearer from wear marks of the sole of the shoe may be obtained. Tool characteristic information obtained in this way may be registered in the database 130 using the DB registration button 153.

Operations 210 to 230 may be repeatedly performed. By repeatedly performing the above process in this way, the reliability of the database 130 may be improved.

Operation 240 is obtaining, by the developed impact mark analysis apparatus 100, a second image for impact marks at a crime scene that are developed by applying an amino acid reaction reagent from evidence at the crime scene.

At this time, the second image for the developed impact marks at the crime scene is a target image to understand what a crime tool is.

The second image may be obtained by directly photographing the developed impact marks at the crime scene using the image acquisition button 151 or by receiving a second image obtained by photographing the developed impact marks at the crime scene from the server 300 or an external imaging device.

Operation 250 is obtaining, by the developed impact mark analysis apparatus 100, a second outline image by outlining the developed second image.

Operation 250 may include, by the developed impact mark analysis apparatus 100, operation 251 of converting the second image into gray scale, operation 253 of adjusting and binarizing a pixel value of the second image converted into gray scale, and operation 255 of extracting an outline of a tool from the second image that is binarized. Operation 250 of obtaining the second outline image may be performed through the same process as operation 250 of obtaining the first outline image described above.

Figure 8:
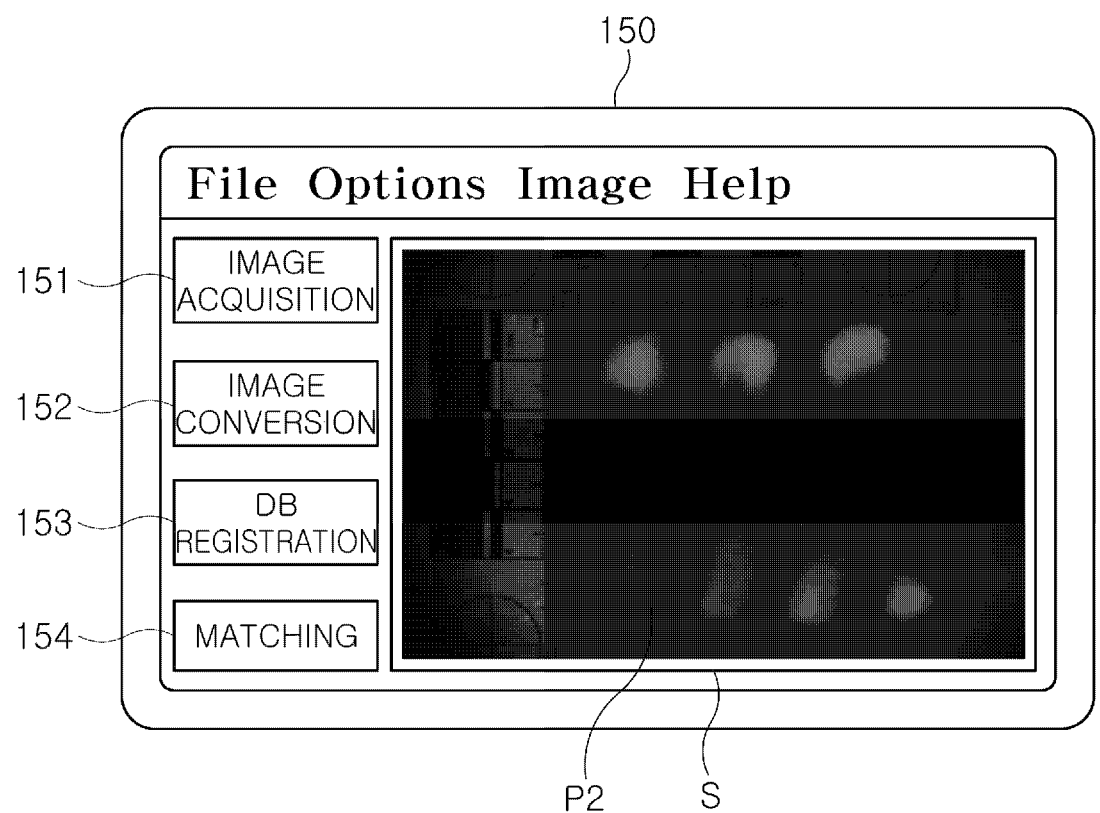

Referring to FIG. 8, a second image P2 converted into gray scale can be seen on the screen S of the display unit 150. However, the second image may be obtained in a gray scale state.

Figure 9:
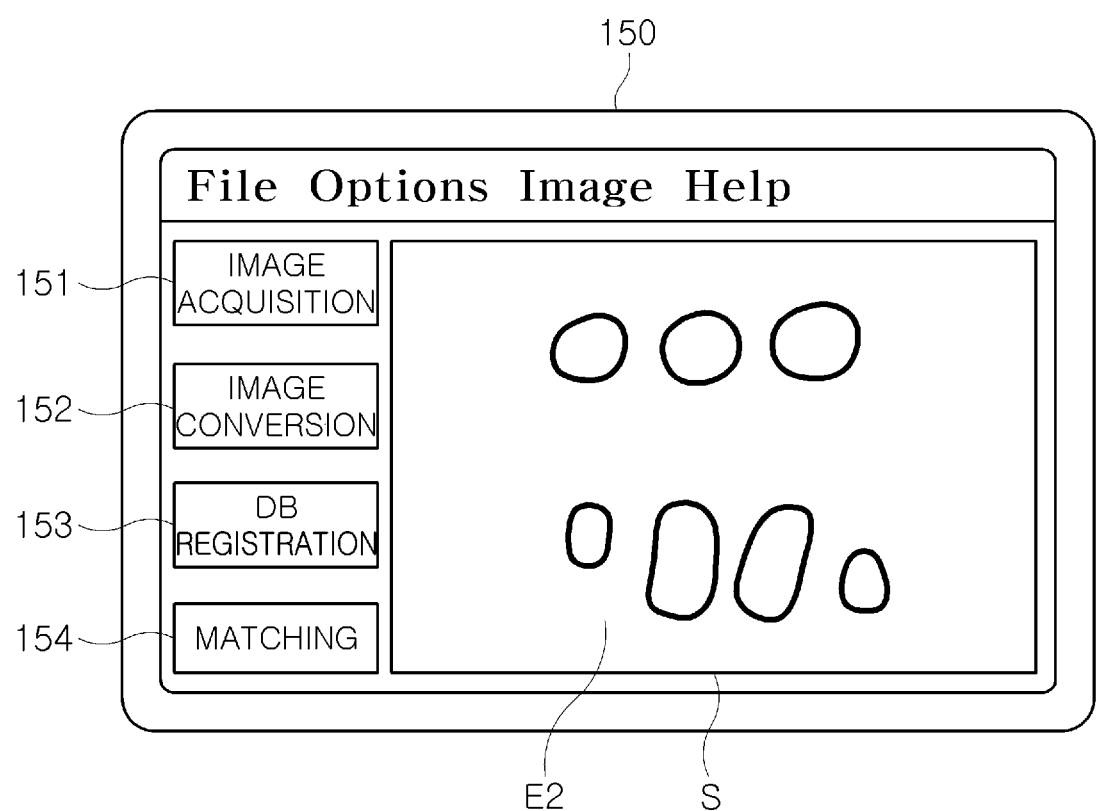

Referring to FIG. 9, a second outline image E2 obtained by outlining the second image P2 converted to the gray scale of FIG. 8 can be seen.

Operation 260 is searching the database 130, by the developed impact mark analysis apparatus 100, for a first outline image determined to be similar to the second outline image and matching the first outline image with the second outline image.

In an embodiment, operation 260 may be performed as follows.

The second outline image is displayed on a screen of the display unit 150 by a user selection through the user input unit 160. When the second outline image is displayed on the display unit 150, the first outline image determined to be similar to the second outline image is matched with the second outline image by searching and displayed on the display unit 150.

The developed impact mark analysis apparatus 100 may generate a matched image by matching the second outline image with the first outline image. In the process of matching the second outline image with the first outline image, an error is calculated, and when the calculated error differs by more than a set reference value, the matching unit 140 may determine that the second outline image does not match the first outline image. In addition, when the calculated error is equal to or less than the set reference value, the matching unit 140 may determine that the second outline image matches the first outline image. Accordingly, a user may generate a matched image using a matching button 154 and check whether the second outline image matches the first outline image.

In another embodiment, operation 260 may be performed as follows.

Operation 260 may include thinning, by the developed impact mark analysis apparatus 100, the first outline image and the second outline image, and determining whether the thinned first outline image and the thinned second outline image are similar by extracting feature points respectively from the thinned first outline image and the thinned second outline image and comparing the feature points with each other.

The thinning is constantly expressing, by the developed impact mark analysis apparatus 100, outlines of the first outline image and the second outline image by one pixel.

The determining of whether the thinned first outline image and the thinned second outline image are similar is extracting, by the developed impact mark analysis apparatus 100, feature points respectively from the thinned first outline image and the thinned second outline image and comparing the feature points with each other to determine whether they are similar.

Operation 260 including the thinning and the determining of the similarity may be performed by the matching unit 140 of the developed impact mark analysis apparatus 100.

For example, unique outline information regarding shapes and positions of a metacarpophalangeal joint and a proximal interphalangeal joint may be obtained by thinning a first outline image formed from impact marks by a fist, and this unique outline information may be extracted as a feature point. For another example, by thinning a first outline image formed from impact marks by a double-edged or single-edged tool, outline information regarding shape and position of a blade of the tool may be extracted as a feature point. In this way, it is possible to extract and utilize various outline information as individual feature points according to the tool.

Accordingly, the similarity may be determined by comparing feature points extracted from the second outline image to identify a crime tool with feature points extracted from the first outline images of the database 130.

Operation 270 is displaying, by the developed impact mark analysis apparatus 100, a result of the matching in which a second outline image, a first outline image matched with the second outline image, and related tool characteristic information are displayed to a user.

The user may use the matching button 154 to check the second outline image, the first outline image matched therewith, and the related tool characteristic information stored corresponding to the first outline image.

Figure 10:
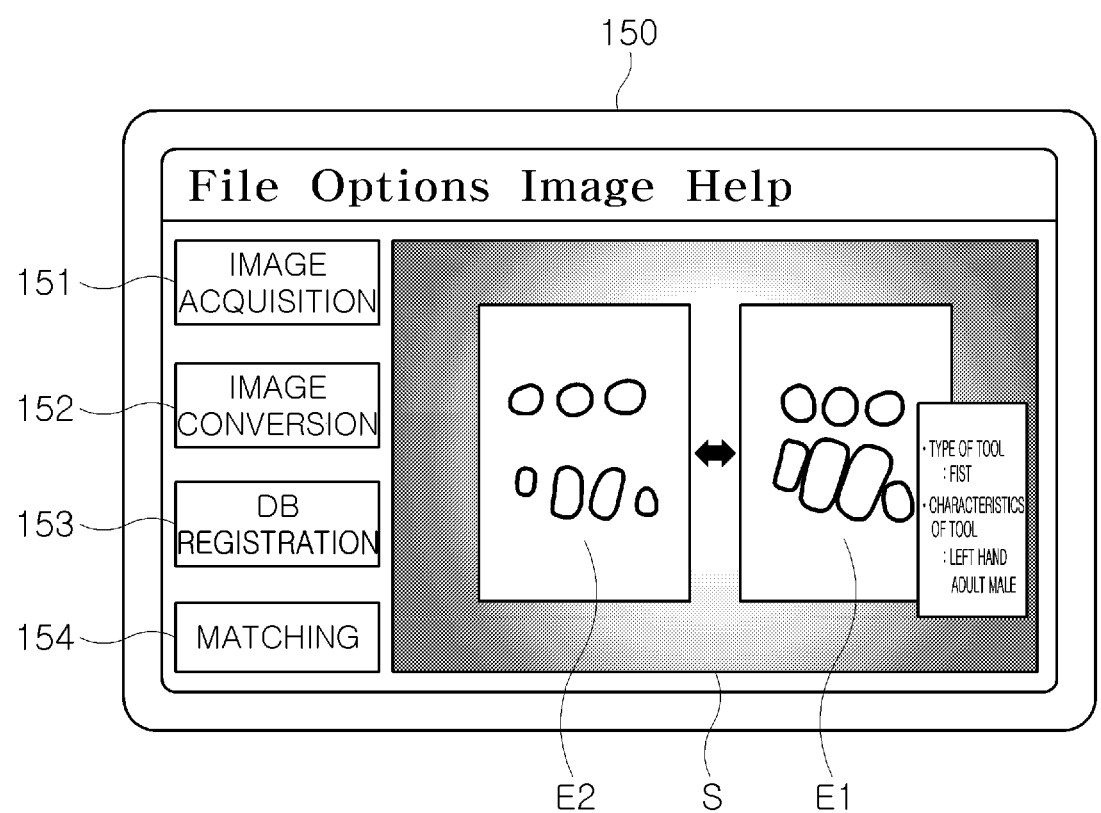

Referring to FIG. 10, the second outline image E2 formed from impact marks at a crime scene is matched with the first outline image E1 formed from impact marks by a fist, and 'fist, left hand, and adult male', which is related tool characteristic information registered corresponding to the first outline image E1, is displayed on the screen S of the display unit 150. A user may check information according to a result of the matching in this way.

The developed impact mark analysis method 200 according to an embodiment shown in FIG. 3 may be written as computer programs and may be implemented in general-use digital computers that execute the programs using a non-transitory computer-readable recording medium. The non-transitory computer-readable recording medium may be a magnetic storage medium (e.g., ROM, a floppy disk, a hard disk, etc.), or an optical reading medium (e.g., a CD ROM, a digital versatile disk (DVD) or the like).

As described above, according to embodiments of the disclosure, because tools and objects may be identified from impact marks that are developed from evidence at a crime scene, such as victim clothing, the impact marks are expected to contribute to the proper resolution of assault and murder cases.

In particular, in the embodiments of the disclosure, more accurate information about tool characteristics may be obtained by outlining images of impact marks developed by an amino acid reaction reagent. In addition, by registering and utilizing the outline images of the developed impact marks in a database, it is possible to efficiently contribute to the analysis of criminal cases.

The description herein is for describing the disclosure and numerous modifications and adaptations will be readily apparent to one of ordinary skill in the art without departing from the spirit and scope of the disclosure. For example, the relevant results may be achieved even when the described technologies are performed in a different order than the described methods, and/or even when the described elements such as systems, structures, devices, and circuits are coupled or combined in a different form than the described methods or are replaced or substituted by other elements or equivalents.

In this regard, the present embodiments may have different forms and should not be construed as being limited to the descriptions set forth herein. While the disclosure has been particularly shown and described with reference to embodiments thereof, it will be understood that various changes in form and details may be made therein without departing from the spirit and scope of the following claims.

What is claimed is:

1. A developed impact mark analysis apparatus comprising:
    an image acquisition unit configured to receive at least one first image that is at least one photograph of impact marks developed by applying an amino acid reaction reagent, and a second image that is a photograph of impact marks at a crime scene, which are developed by applying an amino acid reaction reagent from evidence at the crime scene;
    at least one memory storing computer program instructions; and
    at least one processor configured to execute the computer program instructions to:
    obtain at least one first outline image by outlining the at least one first image, and to obtain a second outline image by outlining the second image;
    store the first outline image corresponding to related tool characteristic information in a database;
    obtain a first thinned outline image and a second thinned outline image by thinning the first outline image and the second outline image, and determine whether the first outline image is matched with the second outline image by comparing the first thinned outline image with the second thinned outline image;
    display the first outline image matched with the second outline image, the second outline image, and the related tool characteristic information on a display.

2. The developed impact mark analysis apparatus of claim 1, wherein the first outline image and the second outline image are obtained by converting the first image and the second image into gray scale, adjusting a pixel value of each of the images converted into gray scale, and binarizing the pixel value to extract an outline of a tool.

3. A developed impact mark analysis method comprising:
    obtaining at least one first image by photographing impact marks that are developed by applying an amino acid reaction reagent;
    obtaining at least one first outline image by outlining the at least one first image;
    storing the first outline image in a database corresponding to related tool characteristic information;
    obtaining a second image for impact marks at a crime scene that are developed by applying an amino acid reaction reagent from evidence at the crime scene;
    obtaining a second outline image by outlining the second image;
    obtaining a first thinned outline image and a second thinned outline image by thinning the first outline image and the second outline image;
    determining whether the first outline image is matched with the second outline image by comparing the first thinned outline image with the second thinned outline image;
    and
    displaying the second outline image, the first outline image matched with the second outline image, and the related tool characteristic information.

4. The developed impact mark analysis method of claim 3, wherein, after a user applies an impact to fabric or clothing in close contact with animal skin using a tool, the developed impact marks are developed by applying an amino acid reaction reagent to the fabric or clothing.

5. The developed impact mark analysis method of claim 3, wherein the tool characteristic information comprises a type of tool, and size, use, or shape characteristics according to the type of tool.

6. The developed impact mark analysis method of claim 3, wherein the obtaining of the at least one first outline image comprises:
    converting the first image into gray scale;
    adjusting and binarizing a pixel value of the first image converted into gray scale; and extracting an outline of a tool from the first image that is binarized.

7. The developed impact mark analysis method of claim 3, wherein the obtaining of the second outline image comprises:
converting the second image into gray scale;
adjusting and binarizing a pixel value of the second image converted into gray scale; and
extracting an outline of a tool from the second image that is binarized.

8. A computer program stored on a non-transitory computer-readable storage medium for executing the method of claim 3 using a computer.

* * * * *